(12) United States Patent
Khosla et al.

(10) Patent No.: US 10,891,488 B2
(45) Date of Patent: Jan. 12, 2021

(54) SYSTEM AND METHOD FOR NEUROMORPHIC VISUAL ACTIVITY CLASSIFICATION BASED ON FOVEATED DETECTION AND CONTEXTUAL FILTERING

(71) Applicant: HRL Laboratories, LLC, Malibu, CA (US)

(72) Inventors: Deepak Khosla, Camarillo, CA (US); Ryan M. Uhlenbrock, Camarillo, CA (US); Huapeng Su, Los Angeles, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/247,157

(22) Filed: Jan. 14, 2019

(65) Prior Publication Data

US 2019/0251358 A1    Aug. 15, 2019

Related U.S. Application Data

(63) Continuation-in-part of application No. 15/947,032, filed on Apr. 6, 2018, which is a continuation-in-part of application No. 15/883,822, filed on Jan. 30, 2018.
(Continued)

(51) Int. Cl.
*G06K 9/00* (2006.01)
*G06K 9/32* (2006.01)
(Continued)

(52) U.S. Cl.
CPC ..... *G06K 9/00744* (2013.01); *G06K 9/00718* (2013.01); *G06K 9/00765* (2013.01);
(Continued)

(58) Field of Classification Search
None
See application file for complete search history.

(56) References Cited

U.S. PATENT DOCUMENTS 8,948,499 B1 *  2/2015  Medasani .......... G06K 9/00771
                                                    382/155
9,008,366 B1    4/2015  Kim et al.
(Continued)

FOREIGN PATENT DOCUMENTS

WO    WO2017182225    10/2017

OTHER PUBLICATIONS

Gould, Stephen, et al. "Peripheral-Foveal Vision for Real-time Object Recognition and Tracking in Video." IJCAI. vol. 7. 2007. APA (Year: 2007).*

(Continued)

*Primary Examiner* — Michelle M Entezari
(74) *Attorney, Agent, or Firm* — Tope-McKay & Associates

(57) ABSTRACT

Described is a system for visual activity recognition. In operation, the system detects a set of objects of interest (OI) in video data and determines an object classification for each object in the set of OI, the set including at least one OI. A corresponding activity track is formed for each object in the set of OI by tracking each object across frames. Using a feature extractor, the system determines a corresponding feature in the video data for each OI, which is then used to determine a corresponding initial activity classification for each OI. One or more OI are then detected in each activity track via foveation, with the initial object detection and foveated object detection thereafter being appended into a new detected-objects list. Finally, a final classification is provided for each activity track using the new detected-
(Continued)

objects list and filtering the initial activity classification results using contextual logic.

21 Claims, 9 Drawing Sheets

Related U.S. Application Data

(60) Provisional application No. 62/642,959, filed on Mar. 14, 2018, provisional application No. 62/516,217, filed on Jun. 7, 2017, provisional application No. 62/479,204, filed on Mar. 30, 2017.

(51) Int. Cl.
    *G06K 9/62*         (2006.01)
    *G06K 9/46*         (2006.01)
    *G06N 3/08*         (2006.01)

(52) U.S. Cl.
    CPC ....... *G06K 9/00771* (2013.01); *G06K 9/3233* (2013.01); *G06K 9/4628* (2013.01); *G06K 9/6271* (2013.01); *G06N 3/08* (2013.01)

(56) References Cited

U.S. PATENT DOCUMENTS

| | | | |
|---|---|---|---|
| 9,030,583 B2* | 5/2015 | Gove | H04N 5/347 348/302 |
| 9,147,255 B1 | 9/2015 | Zhang et al. | |
| 9,216,737 B1 | 12/2015 | Zhu et al. | |
| 9,230,302 B1 | 1/2016 | Owechko et al. | |
| 9,443,320 B1 | 9/2016 | Gaidon | |
| 9,544,550 B1* | 1/2017 | Ni | G06K 9/00771 |
| 2004/0143602 A1 | 7/2004 | Ruiz | |
| 2011/0081043 A1 | 4/2011 | Sabol et al. | |
| 2013/0126703 A1* | 5/2013 | Caulfield | H04N 5/30 250/206 |
| 2013/0279808 A1 | 10/2013 | Levi | |
| 2014/0218468 A1 | 8/2014 | Gao et al. | |
| 2015/0186736 A1 | 7/2015 | Han | |
| 2016/0148054 A1 | 5/2016 | Han et al. | |
| 2016/0292522 A1 | 10/2016 | Chen | |
| 2017/0024877 A1* | 1/2017 | Versace | G06K 9/00664 |
| 2017/0032676 A1 | 2/2017 | Mesmakhosroshahi | |
| 2017/0099200 A1 | 4/2017 | Ellenbogen | |
| 2017/0124415 A1 | 5/2017 | Choi | |
| 2017/0132468 A1 | 5/2017 | Mosher et al. | |
| 2017/0308756 A1* | 10/2017 | Sigal | G06K 9/00335 |
| 2018/0005079 A1 | 1/2018 | Tosic | |
| 2018/0012463 A1* | 1/2018 | Chaudhry | G06T 7/246 |
| 2018/0089542 A1* | 3/2018 | Stoop | G06K 9/6878 |
| 2018/0218515 A1* | 8/2018 | Terekhov | G06K 9/00369 |
| 2018/0232604 A1 | 8/2018 | Seybold | |
| 2019/0130215 A1 | 5/2019 | Kaestle | |

OTHER PUBLICATIONS

Institute, Jozef Stefan, and Ales Ude. "Active humanoid vision and object classification." 2009 24th International Symposium on Computer and Inform (Year: 2009).*

Itti, Laurent. "Automatic foveation for video compression using a neurobiological model of visual attention." IEEE Transactions on Image Processing 13.10 (2004): 1304-1318. (Year: 2004).*

Bileschi, S. (Dec. 2008). Object detection at multiple scales improves accuracy. In 2008 19th International Conference on Pattern Recognition (pp. 1-5). IEEE. (Year: 2008).*

Björkman, M., & Eklundh, J. O. (2004). Attending, foveating and recognizing objects in real world scenes. In British Machine Vision Conference (pp. 227-236). BMVA Press. (Year: 2004).*

Karpathy, G. Toderici, S. Shetty, T. Leung, R. Sukthankar and L. Fei-Fei, "Large-Scale Video Classification with Convolutional Neural Networks," 2014 IEEE Conference on Computer Vision and Pattern Recognition, pp. 1725-1732.

K. Simonyan, A. Zisserman, "Two-stream convolutional networks for action recognition in videos," Advances in Neural Information Processing Systems 27: Annual Conference on Neural Information Processing Systems 2014, pp. 568-576.

Michalis Vrigkas, Christophoros Nikou and Ioannis A. Kakadiaris, "A Review of Human Activity Recognition Methods," Frontier in Robotics and AI, 2015, pp. 1-28.

Jeff Donahue, Lisa Anne Hendricks, Sergio Guadarrama, Marcus Rohrbach, Subhashini Venugopalany, Kate Saenkoz, Trevor Darrell, "Long-term Recurrent Convolutional Networks for Visual Recognition and Description," CVPR 2015, pp. 2625-2634.

Deepak Khosla, Yang Chen, K. Kim, "A Neuromorphic System for Video Object Recognition, Frontiers in Computational Neuroscience," 2014; 8: 147 (2014), pp. 1-12.

AlexNet, https :// en. wikipedia.org / wiki / AlexNet, taken on Dec. 17, 2018, pp. 1-2.

C Szegedy, V Vanhoucke, S Ioffe, J Shlens, Z Wojna, "Rethinking the inception architecture for computer vision," 2016 IEEE Conference on Computer Vision and Pattern Recognition (CVPR), pp. 2818-2826.

VIRAT, found at http : // crcv . ucf . edu / data / VIRAT . php, taken on Dec. 17, 2018, pp. 1 -3.

UCF101, found at http://crcv.ucf.edu/data/UCF101. php, taken on Dec. 17, 2018, pp. 1-6.

Kalal, Z. (2011) OpenTLD. Retrieved from https : // github . com / zk00006 / OpenTLD, taken on Feb. 18, 2019, pp. 1-2.

He, Y. (Jan. 24, 2016) mean-shift-tracking. Retrieved from https : // github . com / HeYijia / mean-shift-tracking taken on Mar. 25, 2019, p. 1.

Olah, C. (Aug. 27, 2015) "Understanding LSTM Networks" Colah's Blog. Retried from http : // colah . github . io/ posts/2015-08-Understanding-LSTMs/#fn1, pp. 1-27.

Notification of Transmittal of International Search Report and The Written Opinion of The International Searching Authority for PCT/US2019/013513; dated Aug. 14, 2019.

International Search Report of the International Searching Authority for PCT/US2019/013513; dated Aug. 14, 2019.

Written Opinion of the International Searching Authority for PCT/US2019/013513; dated Aug. 14, 2019.

Jeff Donahue et al. 'Long-term Recurrent Convolutional Networks for Visual Recognition and Description', in: The IEEE Conference on Computer Vision and Pattern Recognition (CVPR), 2015, pp. 2625-2634.

Notification of Transmittal of International Search Report and The Written Opinion of the International Searching Authority for PCT/US2018/026432; dated Mar. 29, 2019.

International Search Report of The International Searching Authority for PCT/US2018/026432; dated Mar. 29, 2019.

Written Opinion of The International Searching Authority for PCT/US2018/026432; dated Mar. 29, 2019.

Donahue, et al., "Long-term Recurrent Convolutional Networks for Visual Recognition and Description," In The IEEE Conference on Computer Vision and Pattern Recognition (CVPR), 2015, pp. 2625-2634.

Karpathy, et al., "Large-scale Video Classification with Convolutional Neural Networks," The IEEE Conference on Computer Vision and Pattern Recognition (CVPR), 2014, pp. 1725-1732.

Simonyan, et al., "Two-Stream Convolutional Networks for Action Recognition in Videos," In: Proceeding NIPS'14 Proceeding of the 27th International Conference on Neural Information Processing Systems (NIPS). Dec. 2014, pp. 1-9.

Notification of the International Preliminary Report on Patentability Chapter I for PCT/US2018/026432 dated Dec. 19, 2019.

The International Preliminary Report on Patentability Chapter I for PCT/US2018/026432 dated Dec. 19, 2019.

P. Luo, X. Zeng, X. Wang, and X. Tang. Switchable deep network for pedestrian detection. CVPR, 2014, pp. 893-906.

W. Ouyang and X. Wang. Joint deep learning for pedestrian detection. ICCV, 2013, pp. 2056-2063.

(56) References Cited

OTHER PUBLICATIONS

A. Angelova, A. Krizhevsky, V. Vanhoucke, A. Ogale, D. Ferguson, Real-Time Pedestrian Detection With Deep Network Cascades, British Machine Vision Conference (BMVC), 2015, pp. 1-12.
Office Action 1 for U.S. Appl. No. 15/947,032, dated Jan. 8, 2020.
Office Action 1 for U.S. Appl. No. 15/883,822, dated Oct. 9, 2019.
Dollar, P., et al., "Integral channel features," In: British Machine Vision Conference, vol. 2, 2009.
Chen X., et al., "Pedestrian detection with deep convolutional neural network," in Asian Conference on Computer Vision 2014, Nov. 1, pp. 354-365, Springer, Cham. (Year 2014).
Xu Y., et al., "Online discriminative structured output SVM learning for multi-target tracking," IEEE Signal Processing Letters, Jan. 9, 2014; 21(2): 190-4. (Year: 2014).
Verma, A., et al., 2015, "Pedestrian detection via mixture of CNN experts and thresholded aggregated channel features," In Proceedings of the IEEE International Conference on Computer Vision Workshops pp. 163-171, (Year: 2015).
Brauer H., et al, "Robust false positive detection for real-time multi-target tracking," International Conference on Image and Signal Processing Jun. 30, 2014, pp. 450-459, Springer, Cham. (Year: 2014).
Ju J., et al., "Online multi-person tracking with two-stage data association and online appearance model learning," IET Computer Vision, Jul. 18, 2016; 11(1):87-95, (Year 2016).
Response to office Action 1 for U.S. Appl. No. 15/883,822 dated Feb. 6, 2020.
Office Action 2 for U.S. Appl. No. 15/883,822, dated Mar. 6, 2010.
Karpathy, A. et al., "Large-Scale Video Classification With Convolutional Neural Networks" (2014), pp. 1725-1732.
Simonyan, K. et al., "Two-Stream Convolutional Networks for Action Recognition in Videos" (2014), pp. 1-9.
Vrigkas, M. et al., "A Review of Human Activity Recognition Methods," Frontier in Robotics and AI, 2015, pp. 1-28.
Donahue, J. et al., "Long-term Recurrent Convolutional Networks for Visual Recognition and Description," CVPR 2015, pp. 2625-2634.
Khosla, D. "A Neuromorphic System for Video Object Recognition, Frontiers in Computational Neuroscience," vol. 8: Article 147 (2014), pp. 1-12.
Rothe, R. et al. "Non-maximum Suppression for Object Detection by Passing Messages Between Windows" Computer Vision—ACCV 2014. Lecture Notes in Computer Science, vol. 9003 (2015), pp. 290-306.
Kuhn, H. "The Hungarian Method for the assignment problem" Naval Research Logistics Quarterly, 2: pp. 83-97, (1955).
Munkres, J. "Algorithms for the Assignment and Transportation Problems" Journal of the Society for Industrial and Applied Mathematics, 5(1): pp. 32-38, (1957).
Gershgom, D. (Jul. 26, 2017) "The data that transformed AI research—and possibly the world" Retrieved from https://qz.com/1034972/the-data-that-changed-the-direction-of-ai-research-and-possibly-the-world/ , pp. 1-13, downloaded May 21,2018.
Olah, C. (Aug. 27, 2015) "Understanding LSTM Networks" Colah's Blog. Retried from http://colah.github.io/posts/2015-08-Understanding-LSTMs/#fn1, pp. 1-16, downloaded May 21, 2018.
Cortes, C. et al. "Support-vector networks" Machine Learning. 20 (3): pp. 273-297 (1995).
Dorin Comaniciu, et al., "Kernel-Based Object Tracking" IEEE Transactions on Pattern Analysis and Machine Intelligence, vol. 25, No. 5, May 2003, pp. 564-577.
Response to Office Action 2 for U.S. Appl. No. 15/883,822, dated Jun. 3, 2010.
Office Action 3 for U.S. Appl. No. 15/883,822, dated Jun. 15, 2020.
Response to Office Action 1 for U.S. Appl. No. 15/947,032, dated Apr. 7, 2020.
Office Action 2 for U.S. Appl. No. 15/947,032, dated Apr. 20, 2020.

* cited by examiner

| Method | PD | PC | FPPI | Comments |
|---|---|---|---|---|
| M1 | 0.87 | 0.38 | 2.03 | Previous best results |
| M2 | 0.91 | 0.40 | 1.82 | Small improvement in PC and FPPI |
| M3 | 0.88 | 0.71 | 1.72 | Highest PC, lowest FPPI |

FIG. 6

| | PD | PC | FPPI |
|---|---|---|---|
| M1 | | | |
| In/out car | 0.90 | 0.90 | 2.42 |
| open/close trunk | 0.97 | 0.05 | 2.60 |
| Aim/carry weapon | 0.73 | 0.18 | 0.26 |
| M2 | | | |
| In/out car | 0.89 | 0.89 | 2.09 |
| open/close trunk | 0.93 | 0.25 | 2.55 |
| Aim/carry weapon | 0.87 | 0.27 | 0.27 |
| M3 | | | |
| In/out car | 0.80 | 0.73 | 2.06 |
| open/close trunk | 0.91 | 0.64 | 2.41 |
| Aim/carry weapon | 0.92 | 0.80 | 0.35 |

FIG. 7

SYSTEM AND METHOD FOR NEUROMORPHIC VISUAL ACTIVITY CLASSIFICATION BASED ON FOVEATED DETECTION AND CONTEXTUAL FILTERING

CROSS-REFERENCE TO RELATED APPLICATIONS

The present application is a Continuation-in-Part application of U.S. patent application Ser. No. 15/947,032, filed on Apr. 6, 2018, which is a Continuation-in-Part application of U.S. patent application Ser. No. 15/883,822, filed on Jan. 30, 2018, which is a non-provisional application of U.S. Provisional Application No. 62/479,204, filed on Mar. 30, 2017, the entirety of which are hereby incorporated by reference.

U.S. patent application Ser. No. 15/947,032 ALSO claims the benefit of and is a non-provisional patent application of U.S. provisional application No. 62/516,217, filed on Jun. 7, 2017, the entirety of which is hereby incorporated by reference.

The present application ALSO claims the benefit of and is a non-provisional patent application of U.S. Provisional Application No. 62/642,959, filed on Mar. 14, 2018, the entirety of which is hereby incorporated by reference.

GOVERNMENT RIGHTS

This invention was made with government support under U.S. Government Contract Number N00014-15-C-0091. The government has certain rights in the invention.

BACKGROUND OF INVENTION

(1) Field of Invention

The present invention relates to a video-based activity recognition system and, more specifically, to system for visual activity classification based on foveated detection and contextual filtering.

(2) Description of Related Art

Activity recognition is generally the process by which activities of people or objects as observed in a video are automatically recognized. Several researchers have attempted to devise a variety of methods for activity recognition in videos, including using deep learning (see, for example, the List of Incorporated Literature References, Literature Reference Nos. 1-4). One main limitation of such methods is that they only address the activity classification problem: they assume the input is an activity video clip that is centered on and contains just the activity of interest. Such existing techniques are not applicable to intelligence, surveillance, and reconnaissance (ISR) type applications where the scene may contain multiple objects, clutter, and the actual activity of interest occupies a small region of the video both in space and time. In such a class of problems, the objects of interest first need to be detected/classified and tracked before activity classification can be carried out. In addition, a platform on which a video camera is mounted may be aerial or ground, and static or moving. No system exists that is applicable to all such platforms and scenarios.

Thus, a continuing need exists for a system for detecting and classifying activity in streaming or recorded videos taken from static or moving platforms and for multiple applications.

SUMMARY OF INVENTION

This disclosure provides a system for visual activity classification. In various embodiments, the system comprises one or more processors and a memory. The memory is a non-transitory computer-readable medium having executable instructions encoded thereon, such that upon execution of the instructions, the one or more processors perform several operations, such as detecting a set of objects of interest in video data and determining an object classification for each object in the set of objects of interest, the set comprising at least one object of interest; forming a corresponding activity track for each object in the set of objects of interest by tracking each object across frames; for each object of interest and using a feature extractor, determining a corresponding feature in the video data by performing feature extraction based on the corresponding activity track, the feature extractor comprising a convolutional neural network; and for each object of interest, based on the output of the feature extractor, determining a corresponding initial activity classification for each object of interest; detecting one or more objects of interest in each activity track via foveation; appending the initial object detection and foveated object detection into a new detected-objects list; and classifying a final activity of each activity track using the new detected-objects list and filtering the initial activity classification results using contextual logic.

In another aspect, the system performs an operation of controlling a device based on the final activity classification.

In yet another aspect, controlling the device includes causing a mobile platform (e.g., vehicle, drone, etc.) to perform a physical maneuver based on the final activity classification.

In another aspect, controlling the device comprises using a machine to send at least one of a visual, audio, or electronic alert regarding the final activity classification.

In another aspect, the feature extractor further comprises a recurrent neural network, and the one or more processors further perform an operation of: for each object of interest and using the recurrent neural network, extracting a corresponding temporal sequence feature based on at least one of the corresponding activity track and the corresponding feature.

In yet another aspect, the convolutional neural network comprises at least five layers of convolution-rectification-pooling.

In another aspect, the set of objects of interest includes multiple objects of interest, and the convolutional neural network, the recurrent neural network, and the activity classifier operate in parallel on multiple corresponding activity tracks.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a table depicting results across all activities on a helipad drone dataset;

FIG. 7 is a table depicting individual class activity results on the helipad drone dataset;

DETAILED DESCRIPTION

Figure 1:
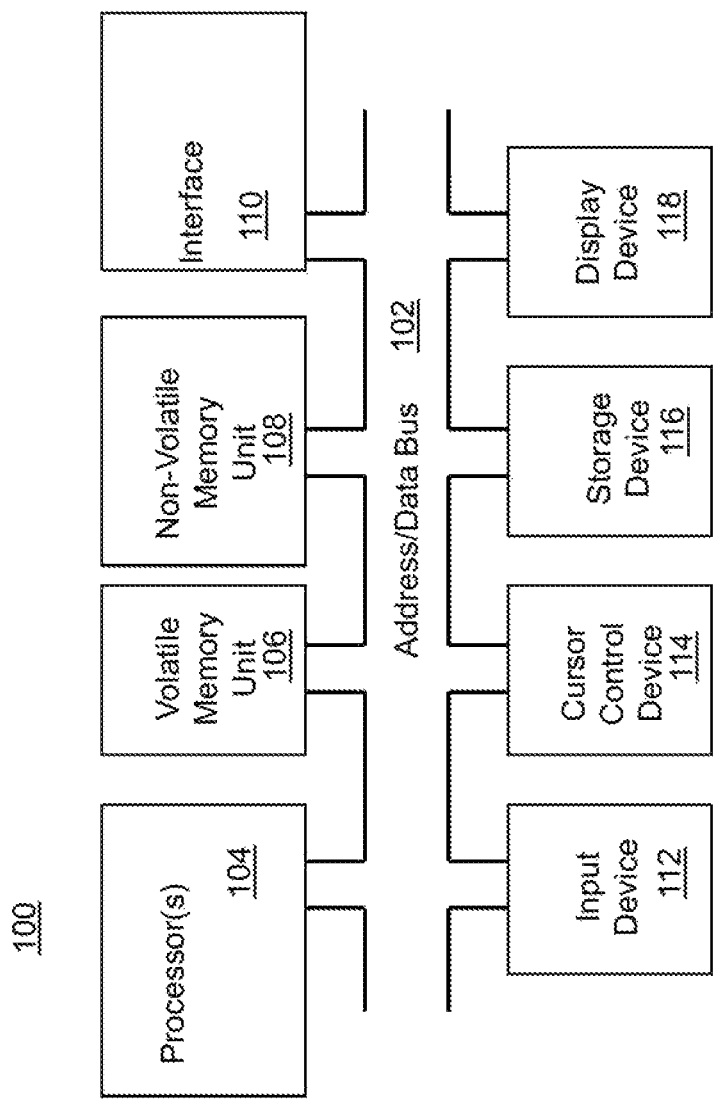
FIG. 1 is a block diagram depicting the components of a system according to various embodiments of the present invention.

The present invention relates to a video-based activity recognition system and, more specifically, to system for visual activity recognition based on foveated detection and contextual filtering. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention.

However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Karpathy, G. Toderici, S. Shetty, T. Leung, R. Sukthankar and L. Fei-Fei, "Large-Scale Video Classification with Convolutional Neural Networks," 2014 *IEEE Conference on Computer Vision and Pattern Recognition*, pp. 1725-1732.
2. Two-stream convolutional networks for action recognition in videos, K. Simonyan, A. Zisserman, *Advances in Neural Information Processing Systems 27: Annual Conference on Neural Information Processing Systems* 2014, pp. 568-576.
3. A Review of Human Activity Recognition Methods, Michalis Vrigkas, Christophoros Nikou and Ioannis A. Kakadiaris, Frontier in Robotics and AI, 2015.
4. Long-term Recurrent Convolutional Networks for Visual Recognition and Description, Jeff Donahue, Lisa Anne Hendricks, Sergio Guadarrama, Marcus Rohrbach, Subhashini Venugopalany, Kate Saenkoz, Trevor Darrell, CVPR 2015.
5. U.S. Pat. No. 9,008,366, Bio-inspired method of ground object cueing in airborne motion imagery, 2015.
6. U.S. Pat. No. 9,147,255, Rapid object detection by combining structural information from image segmentation with bio-inspired attentional mechanisms, 2015.
7. Deepak Khosla, Yang Chen, K. Kim, A Neuromorphic System for Video Object Recognition, Frontiers in Computational Neuroscience, 2014; 8: 147 (2014).
8. AlexNet, https://en.wikipedia.org/wiki/AlexNet, taken on Dec. 17, 2018.
9. Rethinking the inception architecture for computer vision, C Szegedy, V Vanhoucke, S Ioffe, J Shlens, Z Wojna, 2016 IEEE Conference on Computer Vision and Pattern Recognition (CVPR), pp. 2818-2826.
10. VIRAT, found at http://crcv.ucf.edu/data/VIRAT.php, taken on Dec. 17, 2018.
11. UCF101, found at http://crcv.ucf.edu/data/UCF101.php, taken on Dec. 17, 2018.
12. Kalal, Z. (2011) OpenTLD. Retrieved from https://github.com/zk00006/OpenTLD.

13. He, Y. (2016, Jan. 24) mean-shift-tracking. Retrieved from https://github.com/HeYijia/mean-shift-tracking.
14. Rothe, R. et al. "Non-maximum Suppression for Object Detection by Passing Messages Between Windows" Computer Vision—ACCV 2014. Lecture Notes in Computer Science, vol. 9003 (2015).
15. Kuhn, H. "The Hungarian Method for the assignment problem" Naval Research Logistics Quarterly, 2: 83-97 (1955).
16. Munkres, J. "Algorithms for the Assignment and Transportation Problems" Journal of the Society for Industrial and Applied Mathematics, 5(1):32-38, (1957).
17. Olah, C. (2015, Aug. 27) "Understanding LSTM Networks" Colah's Blog. Retried from http://colah.github.io/posts/2015-08-Understanding-LSTMs/#fn1.
18. Cortes, C. et al. "Support-vector networks" Machine Learning. 20 (3): 273-297 (1995).

(2) Principal Aspects

Various embodiments of the invention include three "principal" aspects. The first is a system for visual activity recognition or classification. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside in computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
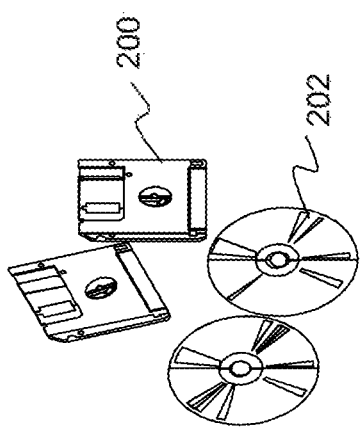
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The present disclosure is directed to a high-accuracy, real-time neuromorphic method and system for activity recognition in streaming or recorded videos from static and moving platforms. The system can detect even small objects and activities with high-accuracy. Unique aspects of the system include (1) the use of foveated detection, similar to how the retina works in the human visual system, and (2) the use of contextual knowledge about activities to filter the activity recognition results. The described system allows for near real-time activity recognition in streaming or recorded videos from static and moving platforms. This invention builds upon and advances the process and system as described in U.S. patent application Ser. No. 15/947,032 (which is incorporated herein by reference) to allow it to detect and classify activities with even higher accuracy, as well as to detect activities involving very small objects (e.g., person carrying a cell phone).

As noted above, the system described herein provides for real-time (or near real-time) visual processing, even on small, low power, low cost platforms (such unmanned aerial or ground vehicles (UAVs and UGVs)). The method can be implemented in a variety of applications where activity recognition or classification is desired. For example, this approach is also amendable for implementation on emerging spiking neuromorphic hardware. The system can also be implemented in ISR applications and in collision avoidance and active safety systems in autonomous vehicles. For further understanding, specific details are provided below.

(4) Specific Details of Various Embodiments

Figure 3:
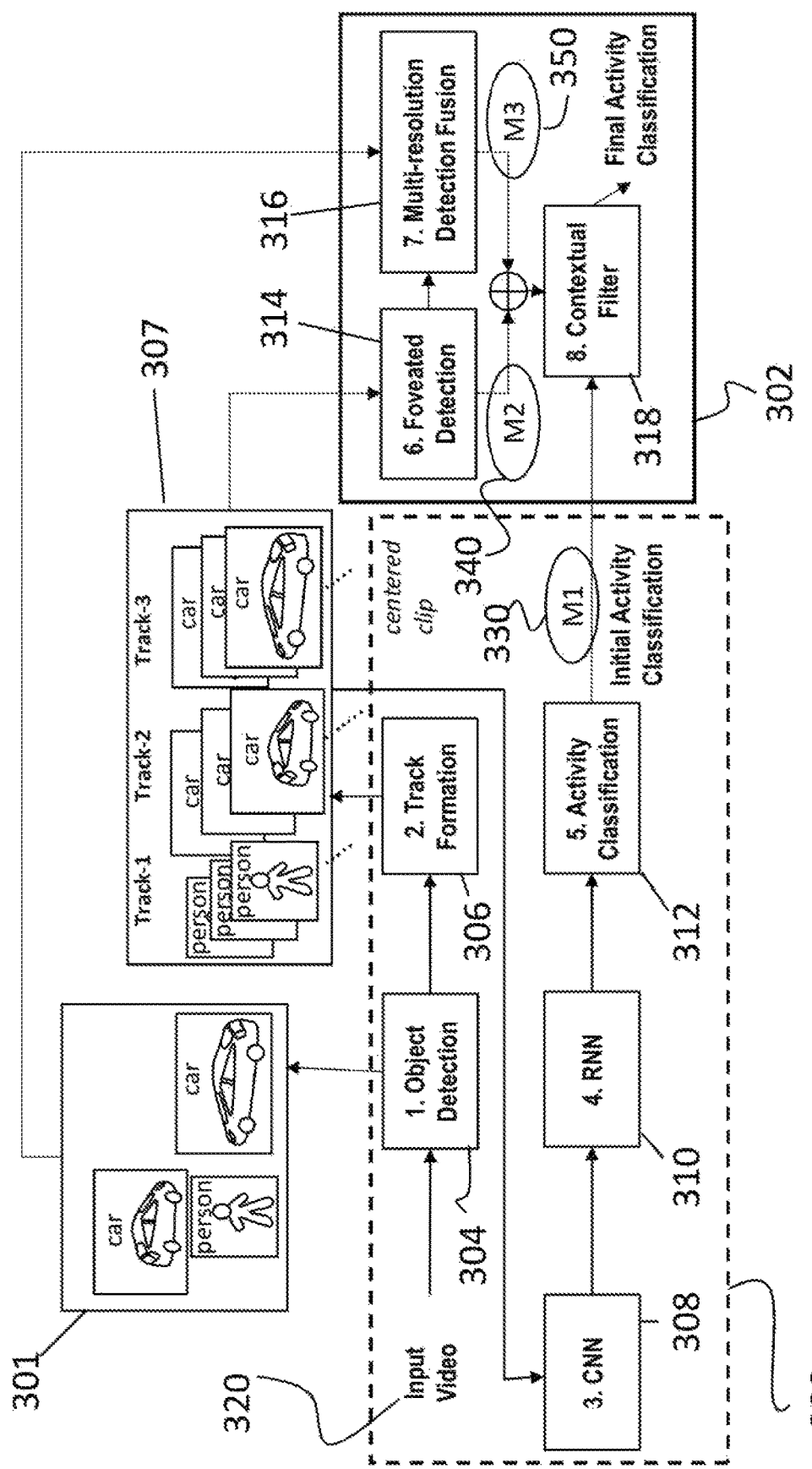
FIG. 3 is an illustration of a block diagram for real-time activity recognition in streaming or recorded videos from static or moving platforms according to various embodiments of the present invention.

A block diagram depicting the system is illustrated in FIG. 3. As shown, the system generally includes an initial activity classification module 300 and a final activity classification module 302. The initial activity classification module 300 was originally described in U.S. patent application Ser. No. 15/947,032, filed on Apr. 6, 2018. The continuous classification activity module 302 improves the classification results to accurately detect and classify activities with even higher accuracy as well as to detect activities involving very small objects (e.g., person carrying a cell phone). Several activities of interest involve people interacting with vehicles or with each other. For example, detection of humans overlapping vehicles is sometimes difficult, even at the full resolution of aerial drone videos. However, detection of vehicles is much more robust. Thus, the previous approach as described in U.S. patent application Ser. No. 15/947,032 has been extended to include foveated detection and object context filtering to improve overall recognition accuracy. Further details are provided below.

The initial activity classification module 300 includes an object detection module 304, track formation module 306, a convolutional neural network (CNN) image feature extractor 308, a recurrent neural network (RNN) temporal feature extractor 310, and an activity classifier 312. In addition, the final or continuous classification activity module 302 includes foveation detection 314, multi-resolution detection fusion 316, and a contextual filter 318. Each of these aspects is described in turn below.

(4.1) Object Detection

The object detection module 304 finds objects of interest in the input video 320 and outputs their bounding box location and class label. For example, if the objective is human activity recognition, then this module 304 detects and classifies all human or "MAN" objects in the incoming video 320. If the objective is vehicle activity recognition, then this detects and classifies all "VEHICLE" objects in the incoming video 320. The object detection module 304 can use any suitable process for identifying the objects of interest and outputting bounding box locations and class labels. For example, for an aerial platform, the process as described in Literature Reference Nos. 5-7 can be used. For a ground platform, the system can employ the technique as described in U.S. patent application Ser. No. 15/883,822, to which the present application claims priority. It should be noted that while specific example embodiments can be employed, the invention is not intended to be limited thereto as other embodiments can be used as well. The detected objects of interest serve as seeds for the next module (track formation).

(4.2) Track Formation

The track formation module 306 maintains the identities and bounding boxes of objects from frame to frame so that the recurrent neural network 310 can operate on a sequence of image chips centered on an object from consecutive frames. Specifically, activity tracks 307 are now formed by tracking the detected objects across frames.

In the track formation module 306, activity tracks 307 are formed by tracking each of object detection 304's detected objects across frames, and forming a corresponding activity track for each detected object. The system uses a multi-target Kalman filter tracker. In other embodiments, alternate trackers may include OpenTLD or Mean Shift Tracking (see Literature Reference Nos. 12 and 13). The system further performs customized non-maximum suppression (see Literature Reference No. 14), and uses heuristics to identify and eliminate false alarm tracks. The Kalman filter is used to predict the centroid of each track in the current frame, and updates a bounding box of a corresponding tracked object accordingly. In some embodiments, a track is a frame-number indexed list of bounding box positions (centered around detected object(s) whose position can change from frame to frame as the object moves) with a unique ID. In some embodiments, the current frame is the frame that is being processed whether it is a recorded video or a streaming live video. In some embodiments, "update" refers to determining where to draw the defining boundaries of the bounding box. Based on this update, in some embodiments, the whole bounding box should be moved to be centered on the predicted centroid.

The width and height of the bounding box in a previous frame is used as the current prediction of the size. The cost is computed using bounding box overlap ratio between the predicted bounding box and the classified bounding box. In other words, the cost is a ratio (e.g., a number between 0 and 1) computed by determining the area of overlap between two rectangles. The Munkres' version of the Hungarian algorithm is used to compute an assignment which minimizes the total cost (see Literature Reference Nos. 15 and 16). In some embodiments, sporadic detections of moving trees, shadows, etc. are removed by only considering tracks with a minimum duration of T seconds (e.g., T is nominally 2 seconds). For some embodiments, the output of the tracks formation module 306 are persistent object tracks that have a minimum duration of T seconds. For example, if a person is carrying a gun in the video and is visible for 5 seconds, tracks formation 306 will output a track of the tracked object (e.g., the gun, the person with the gun, part of the gun such as the gun barrel, etc.) with a unique track number during those 5 seconds.

(4.3) Convolutional Neural Network Feature Extraction

Persistent tracks 307 are provided as inputs to the convolutional neural network (CNN) feature extractor 308. The CNN feature extractor 308 receives the persistent tracks 307 as inputs from tracks formation 306, and based on each track, automatically learns what intermediate features are most useful (e.g., determines a corresponding feature for each object of interest based on the corresponding activity track) from raw image information within each track bounding box. In some embodiments, no explicit features are extracted. In some embodiments, lower layers of the CNN feature extractor 308 may learn edge or orientation features and upper layers of the CNN feature extractor 308 may learn higher-level shape or color information. In some embodiments, the values at the nodes of the various CNN layers are the features. For example, if the last layer of the CNN feature extractor 308 has 4096 nodes, the feature vector may be of size 4096.

Track bounding boxes may be enlarged by some percentage (typically between 1% and 50%, or a more specified percentage, such as 20%) before feature extraction to help with jitter in the underlying detection bounding boxes. In some embodiments, the bounding boxes may be enlarged by between 5% and 40%, although smaller and lower ranges may be possible. In one embodiment, the structure of the CNN in the model is based on AlexNet (see Literature Reference No. 8) and has 5 layers of convolution-rectification-pooling followed by 2 fully-connected layers. In an embodiment, the dimensionality of the CNN 308 output is 4096 features for each frame of the track. In another example embodiment, an Inception v2 model (see Literature Reference No. 9) was pre-trained on an ImageNet 21K classification task as the CNN for spatial feature extraction.

(4.4) Recurrent Neural Network Activity Classifier

The CNN feature extractor 308 is followed by a recurrent neural network (RNN) 310 that extracts temporal sequence features based on the outputs from CNN 308 (e.g., a CNN feature). The CNN feature extractor 308 encodes features per frame, and the RNN 310 concatenates features from multiple frames (i.e., a temporal sequence). In other embodiments, the RNN 310 is not part of the system.

Because activities may have variable time gap between motion (e.g., person entering a building slowly vs. quickly), the Long Short-Term Memory (LSTM) network was used as the temporal component for the RNN 310 (see Literature Reference No. 17). Multiple types of RNN exist, including fully recurrent, recursive, Hopfield, bidirectional associative memory, and others, and other temporal components may be used in different embodiments.

In an embodiment, the LSTM RNN 310 takes as input the 4096-dimensional feature vector from the CNN feature extractor 308. The sequence of these features over N frames, typically N=16 frames, updates the RNN's internal state at each frame. In some embodiments, the 256-dimensional internal state of the RNN 310 at the end of the N frame sequence is used as the output of the RNN 310 stage, which is the input to an initial activity classifier 312.

(4.5) Activity Classifier

As noted above, the system includes an initial activity classifier 312 which receives the output from CNN 308 (e.g., when RNN 310 is not part of the system), or from RNN 310, and determines an initial activity classification for the object of interest. In various embodiments, the activity classifier 312 receives inputs from RNN 310 if used, and otherwise from the CNN 308 if the RNN 310 was not used. In some embodiments, the activity classifier 312 is configured to send alerts and tweets comprising the activity classification, time, and image or video to a user's cell phone or a central monitoring station.

Assuming there are K activities to classify, a final fully-connected layer (e.g., activity classifier 312) with K outputs gives the initial classification probability (e.g., the last layer values are the activity classification results). In various embodiments, values are typically between 0 and 1, and a high score for an activity type indicates a high confidence for that activity type. In a fully connected layer, according to some embodiments, all nodes are connected to all nodes of the previous layer. Alternatively, the activity classifier 312 may be a Support Vector Machine (SVM) (e.g., a support vector network) classifier with K outputs, and the RNN features from RNN 310 can be sent to the SVM (see Literature Reference No. 18). In various embodiments, the SVM is a supervised learning model with one or more associated learning algorithms that analyze data used for classification and/or regression analysis. Some algorithms for finding the SVM classifier include sub-gradient descent and coordinate descent.

The output of the initial activity classifier 312 is a probability or confidence score (e.g., 75%, or a range such as from 0 to 1) for each of the K classes. In some embodiments where the system is configured to be limited to recognizing certain types of activity, no softmax may be used, and instead a threshold is placed on the output response of the K output nodes to determine when an activity of interest is detected. Other activities, e.g. a person simply walking, should have no output above the threshold and receive effectively a label of "no relevant activity." In some embodiments, softmax refers to normalizing the node values so they sum to 1, and the highest value then becomes the declared activity. In winner take all embodiments, the activity with the highest confidence is the activity label of that track. In other words, while each node in the final layer may represent an activity, and the methods describe above are used to determine the output based on those node values (e.g., 80% person digging, 15% person standing, 5% person aiming a gun).

It should be noted that the CNN 308, RNN 310, and activity classification 312 modules run in parallel for each track as output from the track formation module 306. In other words, the CNN 308, RNN 310, and activity classifier 312 may operate sequentially based on the activity tracks and the output of the previously operating modules. In some embodiments, every track from tracks formation 306 goes through its own 308-310-312 or 308-312 processing that is always sequential (per track). Since there can be several tracks in a video, they all have their own independent processing pipeline 308-310-312 or 308-312 and generate independent activity classification results. "Run in parallel" here means the system can process multiple tracks simultaneously (in parallel) in various embodiments.

Figure 4:
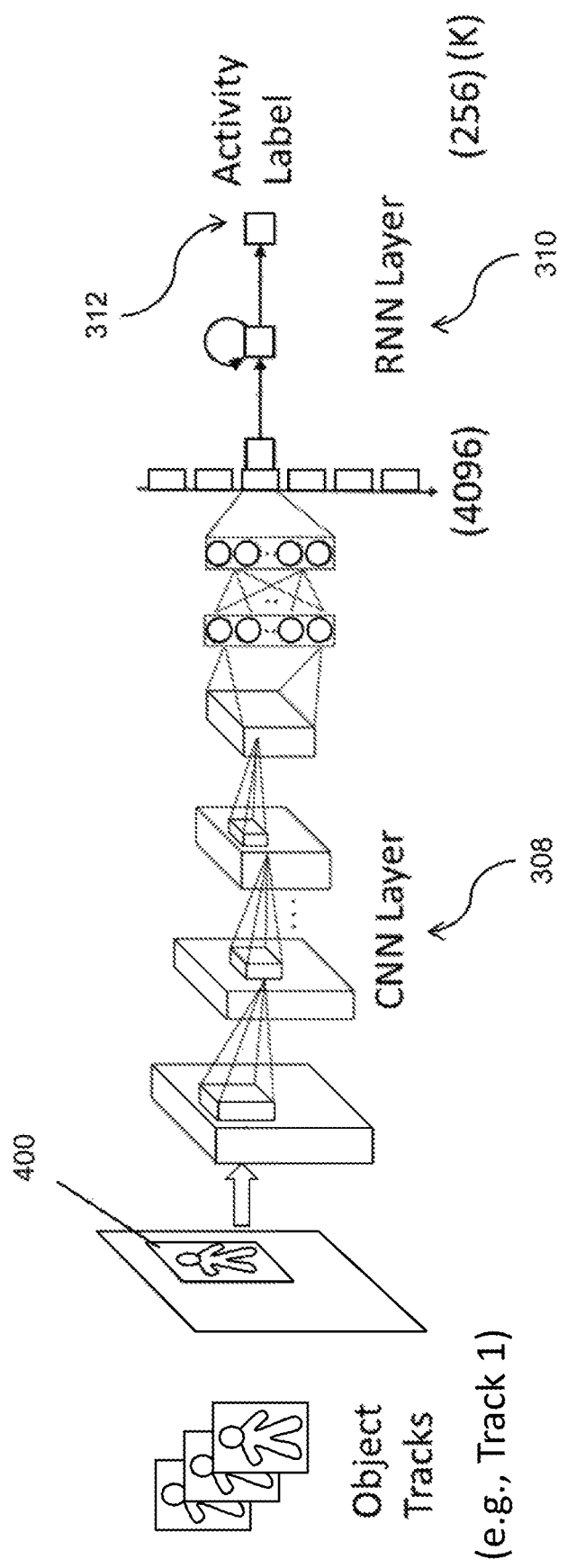
FIG. 4 is an illustration depicting modules associated with an initial activity classification.

For further clarification, FIG. 4 provides an illustration depicting how each track (e.g., Track 1, etc. from the tracks 307) is passed through the CNN 308, RNN 310, and activity classification 312, modules. As noted above, the output of the activity classification 312 process is provided to the contextual filter 318 in the final activity classification module 302 (as described in further detail below).

(4.6) Foveated Detection

The foveated detection module 314 receives the tracks 307 from the track formation module 306 to perform object detection on a foveated region. A foveated region is a smaller and zoomed-in portion of the full image with relevant objects or activities of interest. The system leverages the relationship between entity detection and activity detection to design a foveated detection system in which the detection network is first run on the full frame resolution. Then, for each detected and robust track, the detection network (i.e., object detection module 304) is run again on a foveated region around the track center and expanded larger than the track size (preferred embodiment is 1.5× the size corresponding to the track box, or any other predetermined size). The foveated detection module 314 employs a detection algorithm that is the same as described with respect to the object detection module 304. Detections from this second pass replace those in the foveated region from the first pass that occurs by the object detection module 304. For example, the original object detection process might result in "car", while the foveated detection might result in "person".

For clarity, the output of the foveation detection module 314 (method M2 (element 340)) proceeds to the contextual filter 318 as a final list of objects per each robust track that came out of the track formation module 306. The foveation detection module 314 zooms in (foveation) on that track and re-calculates object detection—so a more accurate classification of objects in that track are provided.

(4.7) Multi-Resolution Detection Fusion

The multi-resolution detection fusion module 316 appends the original object detection 304 results 301 with foveated detection 314 results into a new detected-objects list (e.g., object detection=car, foveated detection person, detected-objects-list=person+car).

During operation, the system runs the object detector 304 twice on the incoming video 320. During the first pass, it analyzes the full video at the native resolution and detects potential objects. A tracker is initiated on every detected object. During the second pass, it analyzes the bounding boxes corresponding to all robust tracks at its resolution to further detect any objects within them that may have been missed in the first pass. This second pass is foveated detection 314. If the first pass detection is accurate, then no new information is gained in the second pass; it only serves as a confirmation. In some cases (e.g., person in front of car), the first pass misses detection of the smaller object (e.g., person), whereas the second pass run on the car track bounding box detects a new object (e.g., person). Although it is possible, experimental results did not provide any instance where the first pass detects more objects than the second pass in the tested data. The detected objects from the first and second pass are appended into a single detected-objects list, which is used for context in the next contextual filtering step.

(4.8) Contextual Filter

The contextual filter 318 uses the detected-objects-list to filter activity classification results. For example, combining foveated or multi-resolution detection fusion and an entity-based contextual filter on the activity classification probabilities can be used to improve activity recognition. The activity recognition can be used for a variety of activities. In some aspects, activities of interest involve people interacting with vehicles or people alone. Thus, the presence or absence of a person or vehicle is closely tied to what activities are possibly occurring in a given region of interest. The convolutional and recurrent neural networks do not explicitly have this entity information as input. The entity detection and localization is generally robust for these two classes.

A contextual filter logic is implemented that modifies the activity class probabilities from the neural network based on the detected entities (i.e., context). This logic is contained in the contextual filter and operates as a set of heuristic rules (e.g., when a vehicle is present, In/Out Facility is not possible). Thus, the logic is based on common sense intuition about the activities that can be predefined. As a non-limiting example, the possible activities are Open/Close Trunk, In/Out Vehicle, In/Out Facility, Person Walking, Person Carrying Weapon, and Person Aiming Weapon. When there are no vehicles or people in a region of interest, no activity is possible. When a vehicle is present, In/Out Facility is not possible; its class probability is set to 0. When a person is present without a vehicle, Open/Close Trunk and In/Out Vehicle are not possible; their probabilities are set to 0. A classifier, such as Softmax, is applied after the filter to renormalize the activity class probability distribution. The final output is an accurate final activity classification label (see FIG. 3) for each track from the track formation module 306.

(5) Example Reduction to Practice

Figure 5:
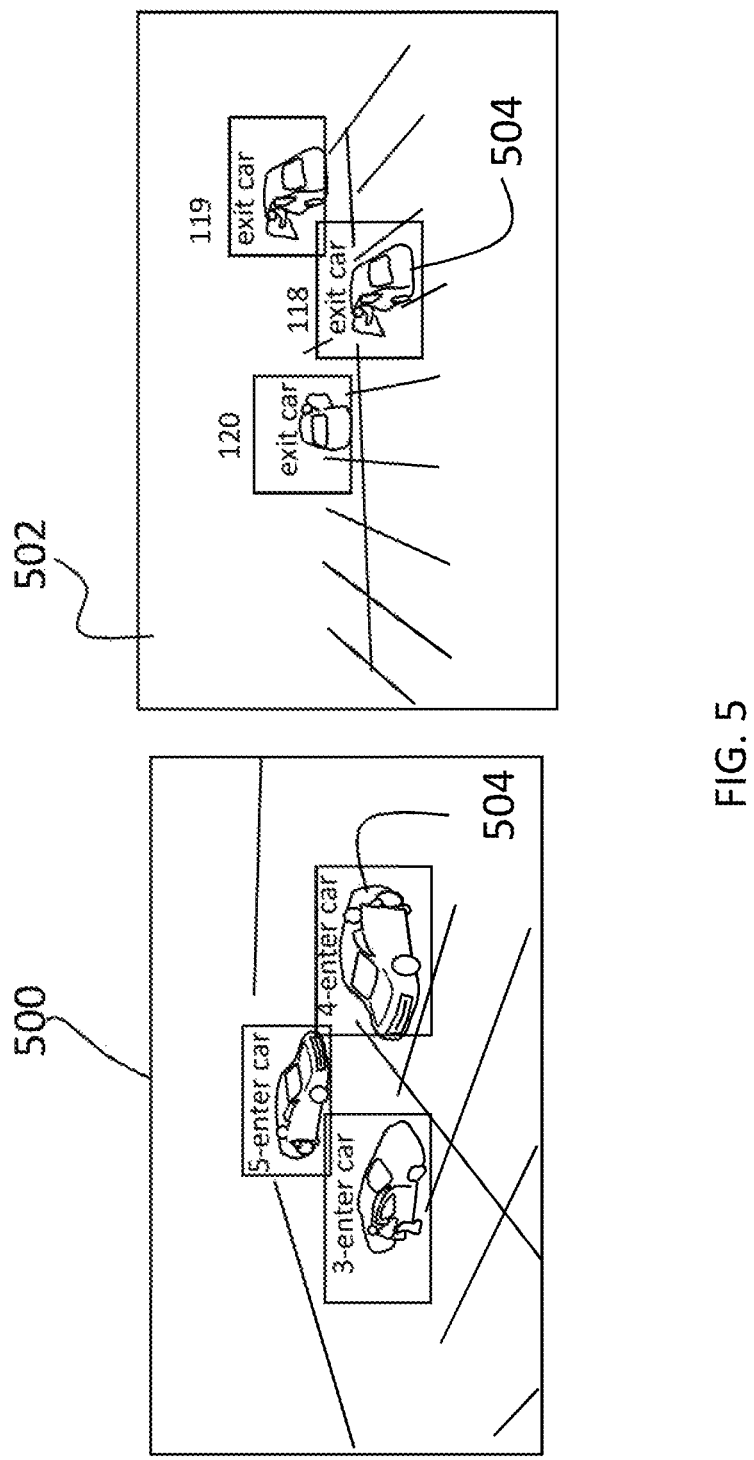
FIG. 5 is an illustration depicting example annotations ("enter vehicle" and "exit vehicle") created for image data obtained from an aerial drone.

For further understanding, the system described herein has been developed and evaluated by combining different strategies for detection and contextual filtering. For experimental purposes, the deep learning architecture based on CNN and RNN were trained for 7 classes of activities, as follows: In/Out Vehicle, Open/Close Trunk, In/out Facility, Person walking, Person Carrying Weapon, Person Aiming Weapon, None. An Inception v2 model pre-trained on an ImageNet 21k classification task was used as the CNN for spatial feature extraction. Further, a 256-hidden-state RNN/LSTM stage for activity recognition was trained on a combination of UCF-101 activity recognition and VIRAT data sets. The dataset involves multiple people and cars performing various activities with a drone hovering over and collecting data from two different viewpoints. The videos were in color with 4K resolution. As shown in FIG. 5, the videos were annotated with ground-truth with bounding boxes and start/stop times, for both "entering vehicle" 500 and "exit vehicle" 502 from two different aspect angles. For example, the videos show the middle vehicle 504 with start and stop times of the frames at 4 and 118, respectively. The times can be listed as any suitable metric, such as seconds, frames, etc.

The test protocol for the online streaming processing scheme uses an object detector to seed an object tracker. When the tracker has accumulated 16 frames of a tracked object, the activity classifier will be invoked. Since In/out Facility and Person walking are under-represented in the data, only the results of the other activities are provided in the tables as depicted in FIGS. 6 and 7. Specifically, the system was operated using three separate methods, depicted in FIG. 3 as M1 330, M2 340, and M3 350. Method 1 (M1 330) provides the best trained results using the prior art technique. Method 2 (M2 340) uses foveated detection and the contextual filter path. Finally, Method 3 (M3 350) uses multi-resolution detection fusion and a contextual filter.

FIG. 6 provides a table depicting results across all activities on the captured drone data. It was shown that Method M3 350 generally performs better than both the prior art M1 330 and method M2 340 (high PC, low FPPI). FIG. 7 provides a table depicting individual class activity results on the captured drone data. Again, it was shown that Method M3 330 generally performs better than both the prior art M1 330 and method M2 340.

Figure 8:
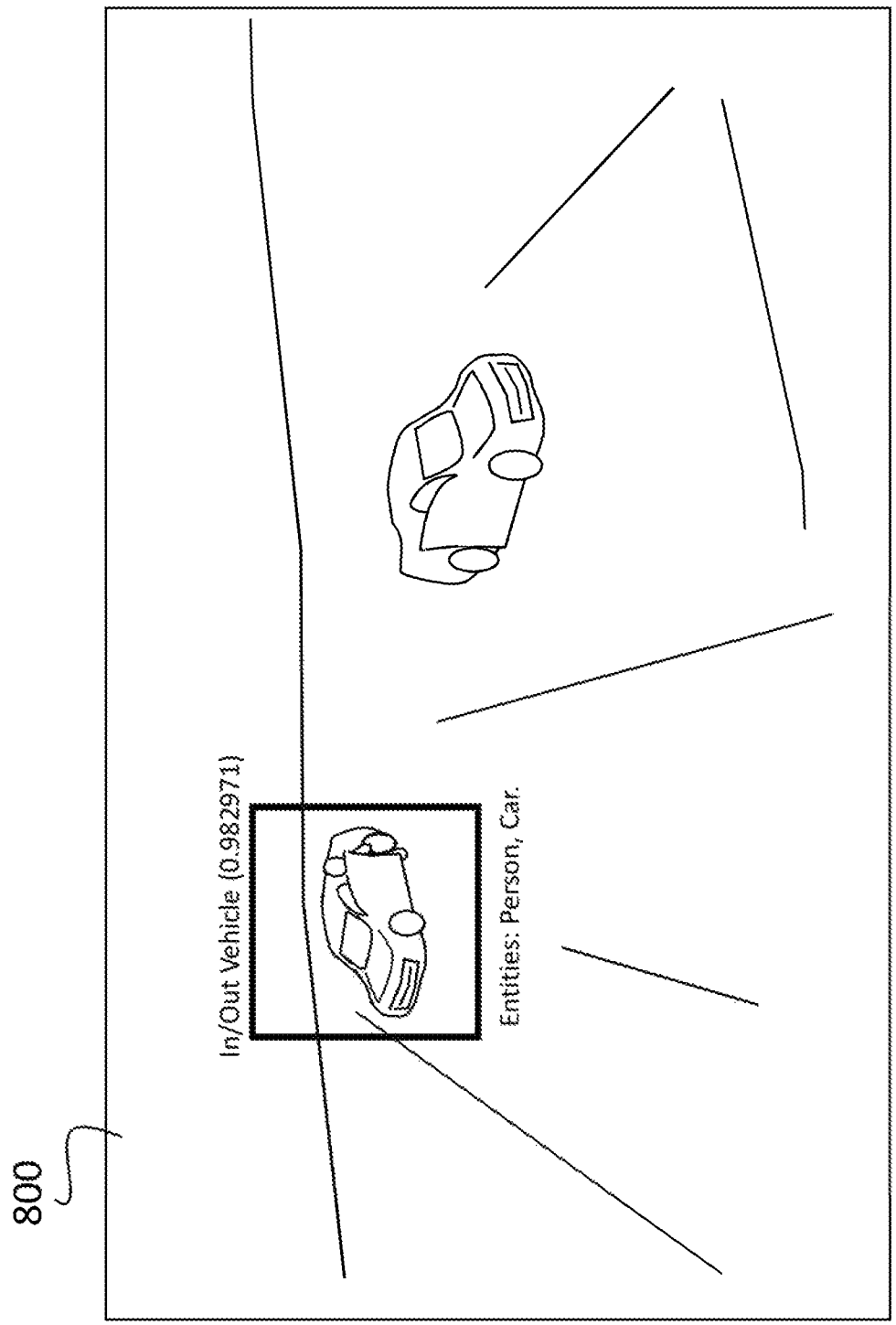
FIG. 8 is an example image depicting a typical recognized activity and detected entity using the method according to various embodiments of the present invention.
Figure 9A:
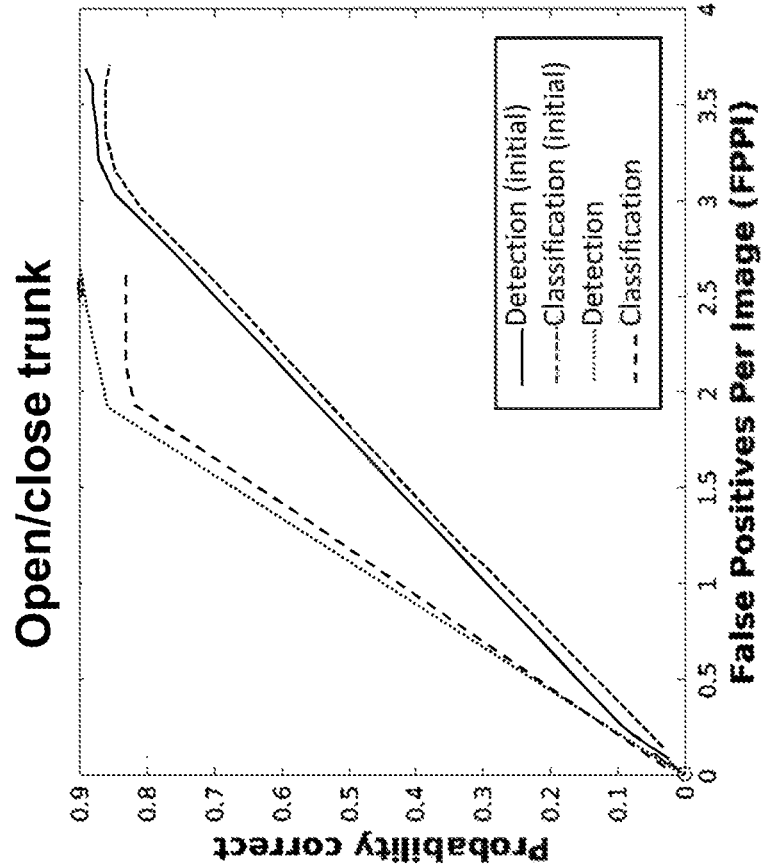
FIG. 9A is an example receiver operating characteristic curve (ROC) for an activity of entering/exiting a car.
Figure 9B:
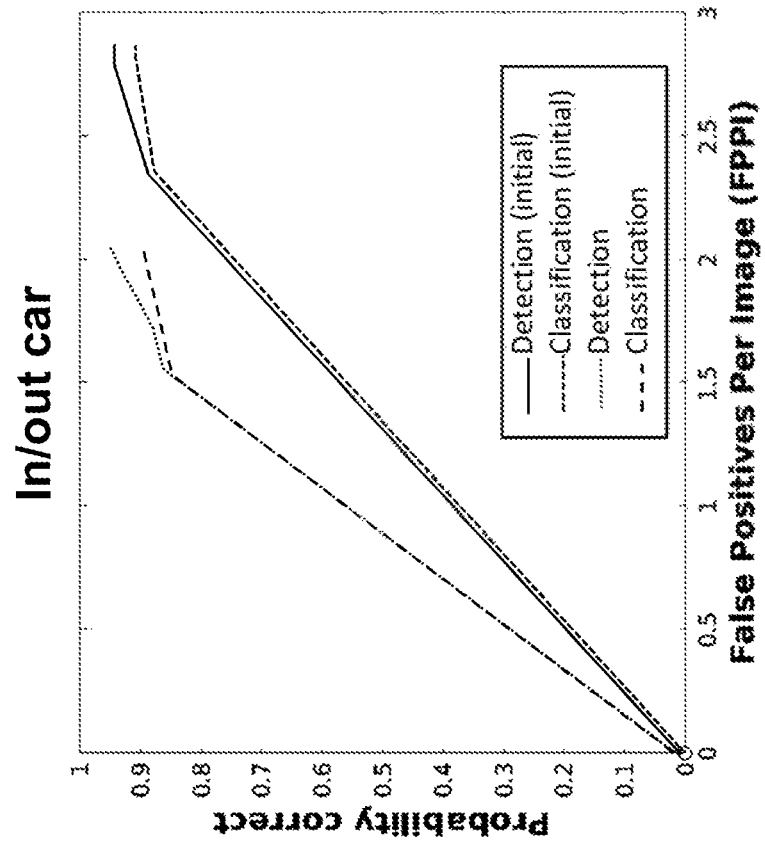
FIG. 9B is an example receiver operating characteristic curve (ROC) for an activity of opening/closing a trunk.

For further illustration, FIG. 8 provides an example image 800 depicting a typical recognized activity and detected entity using Method M3 350 according to various embodiments as described in this disclosure. Further, FIGS. 9A and 9B provide example receiver operating characteristic curves (ROC) for activities of entering/exiting a car, and opening/closing a trunk, respectively. The dashed lines depict the results using Method M1 330, while the solid lines depict the results using Method M3 350. As depicted, for the same correct accuracy (fixed point on y-axis), M3 350 has about 30% less false positives than M1 330. As such, it is shown that the system described herein provides a marked improvement over the prior art in recognizing and classifying activities in real-time video footage.

(6) Control of a Device

Figure 10:
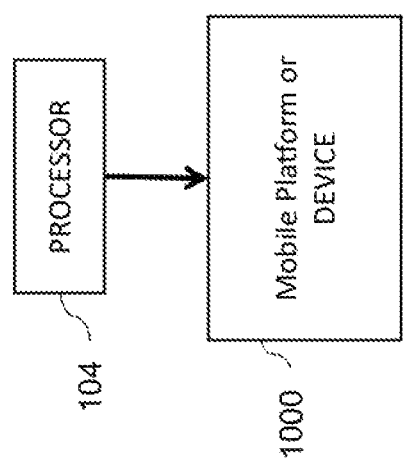
FIG. 10 is a block diagram depicting control of a device according to various embodiments.

As noted above, the system of this disclosure receives an input video and generates an activity classification of people and/or objects in the input video. The system can be incorporated into a wide array of devices and applications. As shown in FIG. 10, the one or more processors 104 may be used to control a device 1000 (e.g., a video camera, a motor, a machine, a drone, an autonomous vehicle, etc.) based on classifying the activity in the input video. In some embodiments, the device 1000 may be controlled to cause the device (e.g., a mobile platform) to move or otherwise initiate a physical action based on the classification.

In some embodiments and as noted above, the device can be a mobile platform such as a drone or autonomous vehicle, rotatable camera system, etc. Thus, in some embodiments, the system is incorporated into a mobile platform, and further comprises an operation of causing the mobile platform to execute a physical operation by the mobile platform (e.g, move, turn, brake, etc.) when the object in the image is recognized or otherwise classified. For example, a drone or other autonomous vehicle may be controlled to move based on the classification. As a non-limiting example, if an individual is classified as exiting a vehicle, the individual may be tracked by causing the drone to follow the individual and maintain the individual within the drone's camera feed. As yet another example, if a classification is provided of pedestrian walking into pathway, an autonomous vehicle may be controlled to cause the vehicle to brake or otherwise maneuver to avoid colliding with the pedestrian. In yet some other embodiments, a camera may be controlled to orient towards an item or object as classified in the input video and follow the classified object. For example, if the classification is person carrying weapon, the system can cause a camera to move and following the person across a scene. In other words, actuators or motors are activated to cause the camera (or sensor) to move or zoom to maintain the classified object within the field of view of the camera as the object moves across a scene.

The system can also be implemented in monitoring and safety systems where an action is implemented based on activity recognition. For example, if an intruder alert, an alert can be provided that a human is entering and doing unsafe activity in a factory area. As another example, the system can be used for human-robot teams where a robot does some action based on recognition of what the human is doing (e.g., if a human is hammering, the robot provides nails/parts, etc.). As another example, the system can be used for manned-unmanned military teams where a drone or ground robot with such a behavior recognition capability can understand the state of the mission and take next actions autonomously (e.g., fire a weapon or surveil behind a building to spot danger).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for visual activity classification, the system comprising:
   one or more processors and a memory, the memory being a non-transitory computer-readable medium having executable instructions encoded thereon, such that upon execution of the instructions, the one or more processors perform operations of:
   detecting a set of objects of interest in video data and determining an object classification for each object in the set of objects of interest, the set comprising at least one object of interest;
   forming a corresponding activity track for each object in the set of objects of interest by tracking each object across frames, each activity track representing a position of an object in the video data across frames;
   for each object of interest and using a feature extractor, determining a corresponding feature in the video data by performing feature extraction based on the corresponding activity track;
   for each object of interest, based on the output of the feature extractor, determining a corresponding initial activity classification for each object of interest;
   performing foveated object detection on a foveated region to detect one or more additional objects of interest in the foveated region, the foveated region being a region of a predetermined size surrounding each activity track;

appending the initial object detection and foveated object detection into a new detected-objects list; and classifying a final activity of each activity track using the new detected-objects list and filtering the initial activity classification results using contextual logic.

2. The system as set forth in claim 1, further comprising an operation of controlling a device based on the final activity classification.

3. The system as set forth in claim 2, wherein controlling a device includes causing a mobile platform to perform a physical maneuver based on the final activity classification.

4. The system as set forth in claim 2, wherein controlling the device comprises using a machine to send at least one of a visual, audio, or electronic alert regarding the activity classification.

5. The system as set forth in claim 1, wherein the feature extractor includes a convolutional neural network and further comprises a recurrent neural network, and the one or more processors further perform operations of:

for each object of interest and using the recurrent neural network, extracting a corresponding temporal sequence feature based on at least one of the corresponding activity track and the corresponding feature.

6. The system as set forth in claim 1, wherein the feature extractor includes a convolutional neural network comprising at least five layers of convolution-rectification-pooling.

7. The system as set forth in claim 1, wherein the set of objects of interest includes multiple objects of interest, and the convolutional neural network, the recurrent neural network, and the activity classifier operate in parallel on multiple corresponding activity tracks.

8. A computer program product for visual activity classification, the computer program product comprising:

a non-transitory computer-readable medium having executable instructions encoded thereon, such that upon execution of the instructions by one or more processors, the one or more processors perform operations of:

detecting a set of objects of interest in video data and determining an object classification for each object in the set of objects of interest, the set comprising at least one object of interest;

forming a corresponding activity track for each object in the set of objects of interest by tracking each object across frames, each activity track representing a position of an object in the video data across frames;

for each object of interest and using a feature extractor, determining a corresponding feature in the video data by performing feature extraction based on the corresponding activity track;

for each object of interest, based on the output of the feature extractor, determining a corresponding initial activity classification for each object of interest;

performing foveated object detection on a foveated region to detect one or more additional objects of interest in the foveated region, the foveated region being a region of a predetermined size surrounding each activity track;

appending the initial object detection and foveated object detection into a new detected-objects list; and classifying a final activity of each activity track using the new detected-objects list and filtering the initial activity classification results using contextual logic.

9. The computer program product as set forth in claim 8, further comprising an operation of controlling a device based on the final activity classification.

10. The computer program product as set forth in claim 9, wherein controlling a device includes causing a mobile platform to perform a physical maneuver based on the final activity classification.

11. The computer program product as set forth in claim 9, wherein controlling the device comprises using a machine to send at least one of a visual, audio, or electronic alert regarding the activity classification.

12. The computer program product as set forth in claim 8, wherein the feature extractor includes a convolutional neural network comprising a recurrent neural network, and the one or more processors further perform operations of:

for each object of interest and using the recurrent neural network, extracting a corresponding temporal sequence feature based on at least one of the corresponding activity track and the corresponding feature.

13. The computer program product as set forth in claim 8, wherein the feature extractor includes a convolutional neural network comprising at least five layers of convolution-rectification-pooling.

14. The computer program product as set forth in claim 8, wherein the set of objects of interest includes multiple objects of interest, and the convolutional neural network, the recurrent neural network, and the activity classifier operate in parallel on multiple corresponding activity tracks.

15. A computer implemented method for visual activity classification, the method comprising an act of:

causing one or more processors to execute instructions encoded on a non-transitory computer-readable medium, such that upon execution, the one or more processors perform operations of:

detecting a set of objects of interest in video data and determining an object classification for each object in the set of objects of interest, the set comprising at least one object of interest;

forming a corresponding activity track for each object in the set of objects of interest by tracking each object across frames, each activity track representing a position of an object in the video data across frames;

for each object of interest and using a feature extractor, determining a corresponding feature in the video data by performing feature extraction based on the corresponding activity track;

for each object of interest, based on the output of the feature extractor, determining a corresponding initial activity classification for each object of interest;

performing foveated object detection on a foveated region to detect one or more additional objects of interest in the foveated region, the foveated region being a region of a predetermined size surrounding each activity track;

appending the initial object detection and foveated object detection into a new detected-objects list; and classifying a final activity of each activity track using the new detected-objects list and filtering the initial activity classification results using contextual logic.

16. The method as set forth in claim 15, further comprising an act of controlling a device based on the final activity classification.

17. The method as set forth in claim 16, wherein controlling a device includes causing a mobile platform to perform a physical maneuver based on the final activity classification.

18. The method as set forth in claim 16, wherein controlling the device comprises using a machine to send at least one of a visual, audio, or electronic alert regarding the activity classification.

19. The method as set forth in claim 15, wherein the feature extractor further comprises includes a convolutional neural network comprising a recurrent neural network, and further comprising an act of:
for each object of interest and using the recurrent neural network, extracting a corresponding temporal sequence feature based on at least one of the corresponding activity track and the corresponding feature.

20. The method as set forth in claim 15, wherein the feature extractor includes a convolutional neural network comprising at least five layers of convolution-rectification-pooling.

21. The method as set forth in claim 15, wherein the set of objects of interest includes multiple objects of interest, and the convolutional neural network, the recurrent neural network, and the activity classifier operate in parallel on multiple corresponding activity tracks.

\* \* \* \* \*